US009765962B2

(12) United States Patent
Sato et al.

(10) Patent No.: US 9,765,962 B2
(45) Date of Patent: Sep. 19, 2017

(54) COMBUSTION DEVICE

(75) Inventors: Jun Sato, Tokyo (JP); Toshimasa Shirai, Yokohama (JP); Yoshihisa Saito, Yokohama (JP); Norio Yoshimitsu, Yokohama (JP); Yasunori Terabe, Yokohama (JP)

(73) Assignee: MITSUBISHI HEAVY INDUSTRIES ENVIRONMENTAL & CHEMICAL ENGINEERING CO., LTD., Yokohama-shi (JP)

( * ) Notice: Subject to any disclaimer, the term of this patent is extended or adjusted under 35 U.S.C. 154(b) by 325 days.

(21) Appl. No.: 14/003,393

(22) PCT Filed: Mar. 18, 2011

(86) PCT No.: PCT/JP2011/056563
§ 371 (c)(1),
(2), (4) Date: Sep. 5, 2013

(87) PCT Pub. No.: WO2012/127562
PCT Pub. Date: Sep. 27, 2012

(65) Prior Publication Data
US 2013/0340689 A1    Dec. 26, 2013

(51) Int. Cl.
*F23G 5/00*    (2006.01)
*F23G 5/027*    (2006.01)
(Continued)

(52) U.S. Cl.
CPC .............. *F23G 5/027* (2013.01); *F22B 1/00* (2013.01); *F22B 21/341* (2013.01); *F23C 3/006* (2013.01);
(Continued)

(58) Field of Classification Search
CPC .............. F23G 5/46; F23M 5/08; F24H 9/06
(Continued)

(56) References Cited

U.S. PATENT DOCUMENTS 4,271,993 A * 6/1981 Anderson ................ C10J 3/08
                                                  222/591
5,050,512 A * 9/1991 Tratz ..................... F23G 5/027
                                                  110/165 A
(Continued)

FOREIGN PATENT DOCUMENTS

EP    0 455 624 A2    11/1991
GB    2 020 403 A     11/1979
(Continued)

OTHER PUBLICATIONS

Extended European Search Report dated Jul. 31, 2014, issued in European Patent Application No. 11861351.2 (5 pages).
(Continued)

*Primary Examiner* — Alissa Tompkins
*Assistant Examiner* — John Bargero
(74) *Attorney, Agent, or Firm* — Westerman, Hattori, Daniels & Adrian, LLP

(57) ABSTRACT

A combustion device includes a device main body having a combustion chamber installed above a cyclone melting furnace configured to combust a pyrolysis gas generated from a waste material after incineration while turning the pyrolysis gas, and configured to combust an unburnt gas discharged from the cyclone melting furnace. Further, the combustion device includes a plurality of sidewall boiler water pipes configured to cover a sidewall of the device main body from a periphery thereof and extending along the sidewall throughout upward and downward directions of the device main body.

8 Claims, 3 Drawing Sheets

(51) Int. Cl.

| | |
|---|---|
| *F23G 5/46* | (2006.01) |
| *F23M 5/08* | (2006.01) |
| *F22B 1/00* | (2006.01) |
| *F23G 5/38* | (2006.01) |
| *F23C 3/00* | (2006.01) |
| *F22B 21/34* | (2006.01) |

(52) U.S. Cl.
CPC ............... *F23G 5/38* (2013.01); *F23G 5/46* (2013.01); *F23M 5/08* (2013.01); *F23G 2201/30* (2013.01); *Y02E 20/12* (2013.01); *Y02P 20/129* (2015.11)

(58) Field of Classification Search
USPC .............................. 122/5; 110/229, 234, 297
See application file for complete search history.

(56) References Cited

U.S. PATENT DOCUMENTS 7,621,227 B2 * 11/2009 Sterr ....................... F23B 30/00 110/108
2011/0209478 A1 * 9/2011 Morita et al. ................... 60/645

FOREIGN PATENT DOCUMENTS

| JP | 49-8070 Y | 2/1974 |
|---|---|---|
| JP | 61-243895 A | 10/1986 |
| JP | 02-007442 U | 1/1990 |
| JP | 02-293513 A | 12/1990 |
| JP | 5-8201 U | 2/1993 |
| JP | 05-331467 A | 12/1993 |
| JP | 10-310783 A | 11/1998 |
| JP | 2002-317915 A | 10/2002 |
| JP | 2003-254502 A | 9/2003 |
| JP | 2007-218458 A | 8/2007 |
| JP | 2007-271205 A | 10/2007 |
| JP | 2007-309642 A | 11/2007 |
| JP | 2008-069984 A | 3/2008 |
| JP | 2009-085559 A | 4/2009 |
| JP | 4295286 B2 | 7/2009 |
| RU | 2001114 C1 | 10/1993 |

OTHER PUBLICATIONS

Japanese Notice of Allowance dated Aug. 5, 2014, issued in Japanese Patent Application No. 2013-505627, w/English translation (6 pages).

International Search Report of PCT/JP2011/056563, mailing date May 17, 2011.

Written Opinion of PCT/JP2011/056563, mailing date of May 17, 2011.

Japanese Office Action dated Feb. 4, 2014, issued in Japanese Patent Application No. 2013-505627, w/English translation (6 pages).

Office Action dated Jul. 10, 2015, issued in counterpart Eurasian Patent Organization Patent Application No. 201391349, with English translation. (4 pages).

* cited by examiner

COMBUSTION DEVICE

FIELD OF THE INVENTION

The present invention relates to a combustion device including a boiler structure capable of processing a waste material, and simultaneously recovering and effectively using waste heat.

BACKGROUND ART

In the related art, a combustion device is known as a processing device of a waste material (see Patent Literature 1). The combustion device is generally constituted by a cyclone melting furnace and a combustion chamber.

The cyclone melting furnace generates a melted slag by introducing a pyrolysis gas including ash and char generated after waste material incineration and rotationally combusting and melting the pyrolysis gas at a high temperature. In addition, an unburnt gas generated in the cyclone melting furnace is discharged to the combustion chamber above the cyclone melting furnace to be combusted again.

A volume reduction of the waste material is accomplished by generation of the melted slag. In addition, since the melted slag can be mixed with concrete to enable resource recovery of the waste material, a lifespan of a final disposal site such as reclaimed land or the like can be extended. Further, toxic substances such as dioxin or the like contained in ash and char are combusted in the combustion device at a high temperature and decomposed to be detoxified.

A boiler structure in which a water pipe is installed is generally employed in a sidewall of the combustion chamber, high temperature waste heat generated in the combustion chamber is recovered by the boiler to be conveyed to a steam turbine, and thus effective use of the waste heat such as power generation is promoted.

RELATED ART DOCUMENT

Patent Document

[Patent Literature 1]
Japanese Unexamined Patent Application, First Publication No. 2007-218458

DISCLOSURE OF THE INVENTION

Problems to be Solved by the Invention

The combustion device can recover and use the waste heat generated upon combustion in the combustion chamber using the sidewall of the combustion chamber as a boiler structure. However, a throttling section configured to effectively perform the combustion is disposed between the cyclone melting furnace and the combustion chamber, the boiler cannot be installed at the sidewall of the cyclone melting furnace due to a specific shape thereof, and thermal recovery throughout the entire sidewall of the combustion device is difficult. Accordingly, a heat exchanger such as a water-cooling jacket or the like configured to cool the sidewall, instead of recovering the waste heat of the boiler, is installed at the sidewall of the cyclone melting furnace, and the waste heat is merely discharged to the outside of the combustion device. That is, in the cyclone melting furnace, thermal energy according to the waste heat is not used.

In consideration of the above-mentioned circumstances, an object of the present invention is to provide a combustion device including a boiler structure capable of efficiently recovering the waste heat.

Solution to Problem

A combustion device of the present invention includes a device main body having a combustion chamber installed above a cyclone melting furnace configured to combust a pyrolysis gas generated from a waste material after incineration while turning the pyrolysis gas, and configured to combust an unburnt gas discharged from the cyclone melting furnace; and a plurality of sidewall boiler water pipes configured to cover a sidewall of the device main body from a periphery thereof and extending along the sidewall throughout upward and downward directions of the device main body.

According to the combustion device including the above-mentioned sidewall boiler water pipe, the waste heat of the entire combustion device in upward and downward directions can be efficiently recovered by the sidewall boiler water pipe.

Further, a bottom section boiler water pipe extending in a vortex shape when seen from a plan view may be installed at a bottom section of the device main body.

Waste heat of a melting furnace bottom section, which has so far been difficult to recover, can be efficiently recovered by the bottom section boiler water pipe.

In addition, the combustion device may include a boiler water supply unit configured to recover a boiler feed water after flowing through the bottom section boiler water pipe and introduce the boiler feed water into the sidewall boiler water pipe from a lower side thereof via a water reservoir section.

As the above-mentioned boiler water supply unit is provided, the boiler feed water to the sidewall boiler water pipe is pre-heated using the waste heat recovered in the bottom section boiler water pipe. Accordingly, steam in the sidewall boiler water pipe can be efficiently generated.

Further, a throttling section may be formed between the cyclone melting furnace and the combustion chamber by reducing a portion of the sidewall of the device main body in diameter in upward and downward directions, and some of the plurality of sidewall boiler water pipes may be spaced apart from the sidewall section.

As the spaced sidewall boiler water pipes are provided as described above, interference between the sidewall boiler water pipes can be avoided by reduction in diameter of the sidewall of the device main body at the throttling section. That is, the sidewall can be covered throughout the entire sidewall of the device main body without variation in number of the sidewall boiler water pipes. As a result, poor circulation of the boiler feed water can be prevented, and a larger amount of waste heat can be recovered.

Furthermore, as some of the sidewall boiler water pipes are spaced apart from the sidewall as described above, a space is generated between the sidewall boiler water pipe and the sidewall. An operator can easily approach the combustion device through the space, and maintenance of the combustion device is easily performed to reduce the cost thereof.

In addition, at least four blowing ports configured to introduce air into an upper portion of the combustion chamber according to the present invention may be installed in a circumferential direction thereof at an interval.

As the above-mentioned blowing port is provided, the air is blown into a center of the combustion chamber, and an exhaust gas discharged from the cyclone melting furnace and blown out of the center of the combustion chamber can be efficiently re-combusted.

Effects of the Invention

According to the combustion device of the present invention, as the entire device main body sidewall of the combustion device is configured as a boiler structure, previously wasted waste heat of the cyclone melting furnace can be efficiently recovered.

MODE FOR CARRYING OUT THE INVENTION

Figure 1:
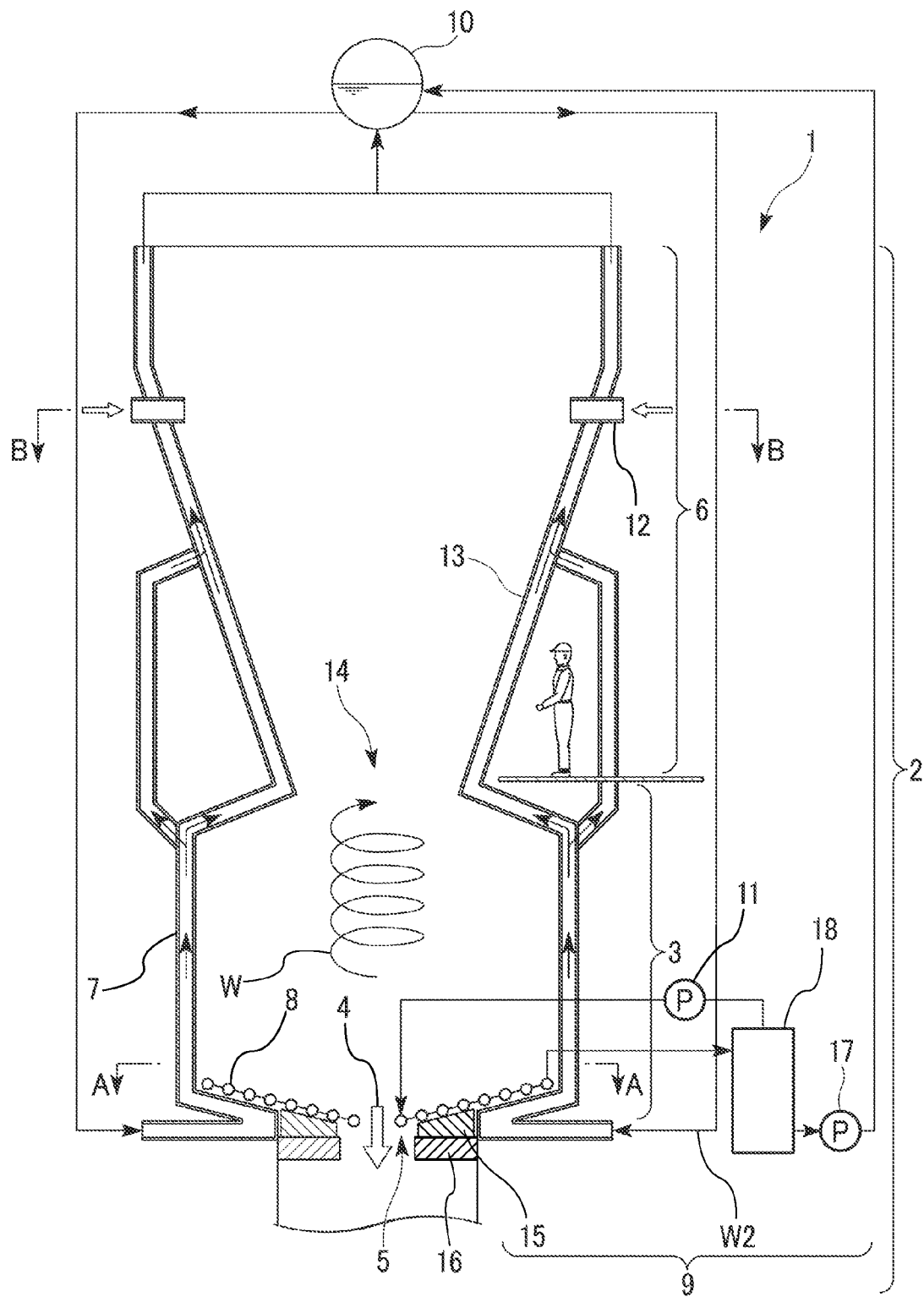
FIG. 1 is a longitudinal cross-sectional view of a combustion device according to a first embodiment of the present invention when seen from the front.

Hereinafter, a combustion device 1 of a first embodiment of the present invention will be described with reference to FIGS. 1 to 3.

The combustion device 1 is used when a pyrolysis gas W including ash and char generated upon waste material incineration is introduced into a device and combusted at a high temperature while turning the pyrolysis gas W, performing melting processing.

The combustion device 1 includes a device main body 2 having a cyclone melting furnace 3 and a combustion chamber 6 therein, a plurality of sidewall boiler water pipes 7, a bottom section boiler water pipe 8, a boiler water supply unit 9, and a blowing port 12.

The device main body 2 has a tubular sidewall 13 extending in a vertical direction. The sidewall 13 has a portion reduced in a diameter in upward and downward directions, and the diameter-reduced portion is a throttling section 14 of the device main body 2.

A space under the throttling section 14 in the device main body 2 is the cyclone melting furnace 3, and a slag hole 5 configured to discharge a melted slag 4 generated by the cyclone melting furnace 3 is installed at a lower portion of the cyclone melting furnace 3, i.e., a lower portion of the device main body 2.

In addition, a space over the throttling section 14 in the device main body 2 is the combustion chamber 6 having a tapered shape in which a diameter is gradually increased as the sidewall 13 goes upward.

That is, in this embodiment, the combustion chamber 6 is continuously formed above the cyclone melting furnace 3 via the throttling section 14 to constitute the device main body 2.

The sidewall boiler water pipes 7 are installed to cover the entire sidewall 13 of the device main body 2 from a periphery thereof upward in a vertical direction of the device main body 2 from above to below the sidewall 13 of the device main body 2, i.e., from a lower end of the cyclone melting furnace 3 to an upper end of the combustion chamber 6.

In addition, in the throttling section 14, some of the sidewall boiler water pipes 7 (in this embodiment, half of the sidewall boiler water pipes 7) are spaced apart from the sidewall 13 of the device main body 2, and configured as non-heating pipes that do not recover waste heat. Then, the non-heating pipes become heating pipes again formed to cover the sidewall 13 of the device main body 2 again at a position at which the sidewall 13 of the device main body 2 above the throttling section 14 is somewhat increased in diameter.

Figure 2:
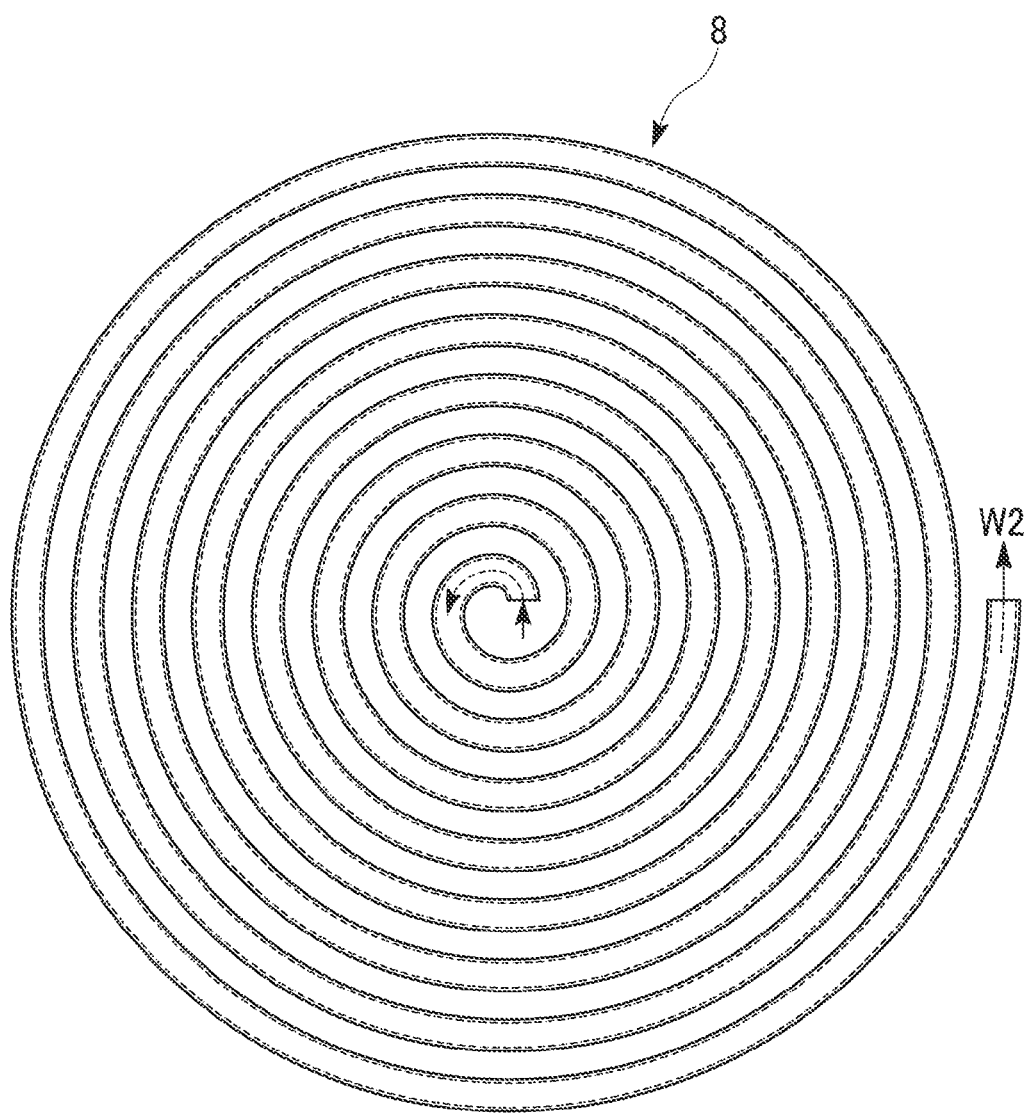
FIG. 2 is a view taken along line A-A of FIG. 1, showing a bottom section boiler water pipe installed at a bottom section of a cyclone melting furnace constituting the combustion device according to the first embodiment of the present invention.
Figure 3:
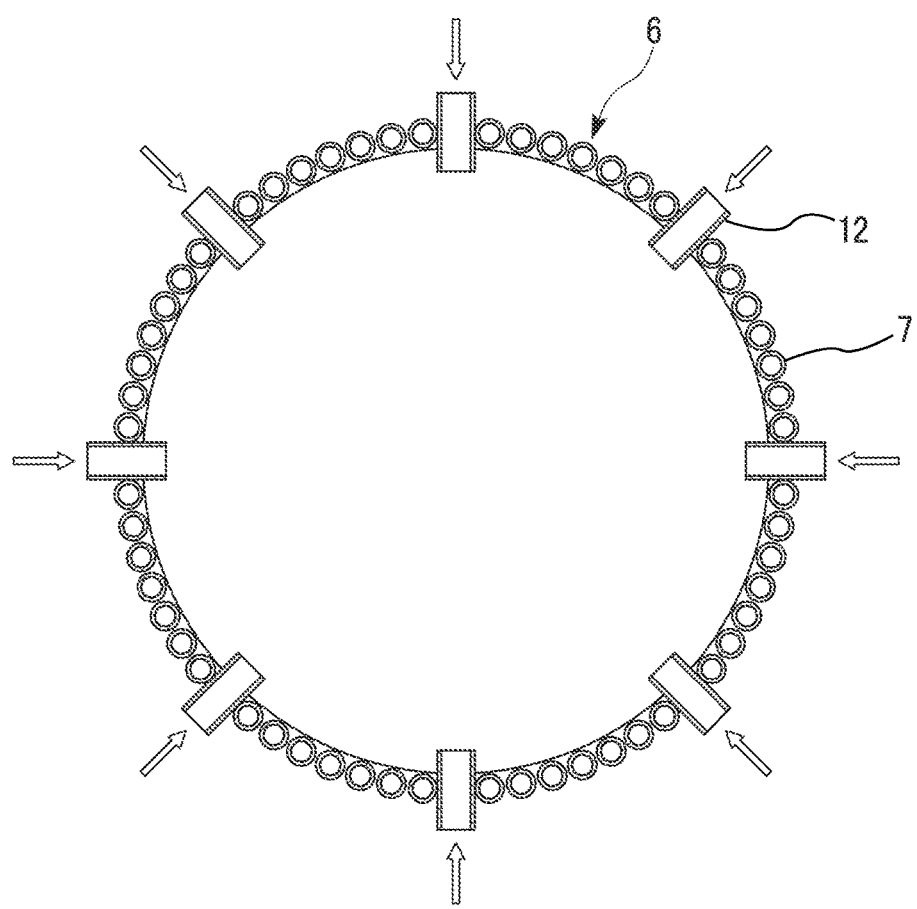
FIG. 3 is a view taken along line B-B of FIG. 1, showing an air blowing port installed at a combustion chamber constituting the combustion device according to the first embodiment of the present invention.

The bottom section boiler water pipe 8, which is a water pipe extending in a vortex shape when seen from a plan view as shown in FIG. 2, is disposed at a bottom section of the cyclone melting furnace 3. The bottom section boiler water pipe 8 is fixed to a support frame 15, and disposed on a protrusion 16 protruding from an inner wall of a lower space of the cyclone melting furnace 3 toward a center of the space. The protrusion 16 and the support frame 15 are not completely fixed to each other and have a structure allowing expansion and contraction due to a variation in temperature of the bottom section boiler water pipe 8 itself. Further, a gap is formed between the bottom section boiler water pipe 8 and the sidewall boiler water pipe 7.

The boiler water supply unit 9 is constituted by a deaeration water feeder 18 configured to supply a boiler feed water W2 into the bottom section boiler water pipe 8, a first pump 11 configured to pump the boiler feed water W2 into the bottom section boiler water pipe 8 and recover the water, a drum (a water reservoir section) 10 configured to recover and store the boiler feed water W2 from the sidewall boiler water pipe 7 above the device main body 2 and supply the boiler feed water W2 into the sidewall boiler water pipe 7 again, and a second pump 17 configured to pump the boiler feed water W2 recovered by the bottom section boiler water pipe 8 from the deaeration water feeder 18 to the drum (the water reservoir section) 10.

Then, the boiler water supply unit 9 of this embodiment is configured to provide two systems of forced circulation and natural circulation. That is, the bottom section boiler water pipe employs a forced circulation type, and the boiler feed water W2 from the deaeration water feeder 18 is pumped and circulated in the bottom section boiler water pipe 8 and then returned to the deaeration water feeder 18 again.

Next, the boiler feed water W2 circulated in the bottom section boiler water pipe 8 and having recovered the waste heat is introduced from a lower side of the sidewall boiler water pipe 7 via the drum (the water reservoir section) 10 and absorbs heat in the sidewall boiler water pipe 7. Accordingly, the boiler feed water W2 is decreased in specific gravity and raised upward. In this way, the sidewall boiler water pipe 7 employs a natural circulation type in which the boiler feed water W2 is naturally raised to ultimately become steam.

The blowing port 12 is an air introduction port in communication with the inside and the outside of the combustion chamber 6 and formed toward a center of the combustion chamber 6, and at least four (in this embodiment, eight) blowing ports are formed in a circumferential direction with respect to an upper portion of the combustion chamber 6.

Next, an operation of the above-mentioned combustion device 1 will be described.

In the combustion device 1, the pyrolysis gas W including ash and char generated upon waste material incineration passes through a pyrolysis gas duct (not shown) to be introduced into the cyclone melting furnace 3. The pyrolysis gas W is turned and combusted to melt the ash and char, then the melted slag 4 is resultantly generated and discharged through the slag hole 5.

Further, some of the sidewall boiler water pipes 7 are installed to be spaced apart from the sidewall 13 in the throttling section 14. Accordingly, even though the sidewall 13 of the device main body 2 in the throttling section 14 is reduced in diameter, interference between the sidewall boiler water pipes 7 can be avoided, and the entire sidewall 13 can be covered without variation in the number of sidewall boiler water pipes 7. In addition, as a result of spacing the sidewall boiler water pipes 7 from the sidewall 13, a space is formed between the non-heating pipe and the sidewall 13.

Further, in this embodiment, as a space between the protrusion 16 and the support frame 15 is a slidable structure, generation of cracks due to thermal expansion and contraction when the bottom section boiler water pipe 8 recovers the waste heat is avoided. In addition, as the sidewall boiler water pipes 7 are installed to form a gap with the bottom section boiler water pipe 8, generation of cracks due to thermal expansion and contraction caused by a temperature difference between the sidewall boiler water pipe 7 and the bottom section boiler water pipe 8 can be prevented. Accordingly, the bottom section boiler water pipe 8 can be installed at the bottom section of the cyclone melting furnace 3 without damage to the bottom section boiler water pipe 8.

Then, in the boiler water supply unit 9 of this embodiment, as the forced circulation and the natural circulation of the boiler feed water W2 coexist, the waste heat recovery in the bottom section of the cyclone melting furnace 3 can be performed using the bottom section boiler water pipe 8, in which the natural circulation is difficult due to extension in the horizontal direction.

In addition, in the combustion chamber 6 disposed at an upper portion of the combustion device 1, re-combustion of the unburnt gas discharged from the cyclone melting furnace 3 is performed. Here, in this embodiment, the air is blown from the eight blowing ports 12 disposed at the upper portion of the combustion chamber 6 toward the center section of the combustion chamber 6 to improve combustion efficiency of the unburnt gas.

In the above-mentioned combustion device 1, the waste heat generated from the combustion device 1 can be recovered more by the sidewall boiler water pipe 7 that can recover the waste heat from the entire sidewall 13 of the cyclone melting furnace 3 and the combustion chamber 6 and by the bottom section boiler water pipe 8 that can recover the waste heat generated from the bottom section of the cyclone melting furnace 3. Then, power can be obtained using the steam generated by the recovered waste heat as a power source of a steam turbine. A cost reduction can be accomplished through sale or the like of the obtained power, and further, waste of the waste heat from the combustion device 1 is reduced to contribute to the prevention of global warming.

Further, since maintenance of the device main body 2 is easily performed through a space formed between the non-heating pipe and the sidewall 13 of the device main body 2, a cost reduction effect can be accomplished.

In addition, here, since unburnt combustibles in the cyclone melting furnace 3 can be efficiently combusted due to the eight blowing ports 12 installed at the upper portion of the combustion chamber 6, a reduction effect of toxic substances contained in the exhaust gas such as CO or the like is accomplished to contribute to protection of the global environment. However, the number of blowing ports 12 installed to combust the unburnt combustibles is not limited to be equal to or more than four, since such numbers do not depart from the spirit of the present invention.

In addition, in the combustion device 1 of this embodiment, a built-in type soot blow may be installed as a stuck ash removal unit in the device main body 2. In this case, since an installation space of the combustion device 1 can be reduced in comparison with a detachable type soot blow, a cost reduction effect can be accomplished. The built-in type soot blow should be formed of a special material capable of enduring corrosion and creep destruction in a high temperature environment of 400° C. or more.

REFERENCE SIGNS LIST 1 combustion device
2 device main body
3 cyclone melting furnace
4 melted slag
5 slag hole
6 combustion chamber
7 sidewall boiler water pipe
8 bottom section boiler water pipe
9 boiler water supply unit
10 drum (water reservoir section)
11 first pump
12 blowing port
13 sidewall
14 throttling section
15 support frame
16 protrusion
17 second pump
18 deaeration water feeder
W pyrolysis gas
W2 boiler feed water

The invention claimed is:

1. A combustion device comprising: a device main body having a combustion chamber installed above a cyclone melting furnace configured to combust a pyrolysis gas generated from a waste material, and configured to combust an unburnt gas discharged from the cyclone melting furnace; a plurality of sidewall boiler water pipes configured to cover a sidewall of the device main body from a periphery thereof and extending along the sidewall throughout upward and downward directions of the device main body; a bottom section boiler water pipe extending in a vortex shape when seen from a plan view and installed at a bottom section of the device main body; and a protrusion protruding from an inner wall of the device main body toward the center of a space being formed by the inner wall and being placed in a lower position of the cyclone melting furnace, wherein the bottom section boiler water pipe is slidably laid on the protrusion, the combustion device further comprises a support frame disposed between the bottom section boiler water pipe and the protrusion, and the bottom section boiler water pipe is fixed to the support frame which is slidably laid on the upper surface of the protrusion.

2. The combustion device according to claim 1, further comprising a boiler water supply unit configured to recover boiler feed water after flowing through the bottom section boiler water pipe and introduce the boiler feed water into the sidewall boiler water pipe from a lower side thereof via a water reservoir section.

3. The combustion device according to claim 1, wherein a throttling section is formed between the cyclone melting furnace and the combustion chamber by reducing a portion of the sidewall of the device main body in diameter in upward and downward directions, and some of the plurality of sidewall boiler water pipes are spaced apart from the sidewall section.

4. The combustion device according to claim 2, wherein a throttling section is formed between the cyclone melting furnace and the combustion chamber by reducing a portion of the sidewall of the device main body in diameter in upward and downward directions, and some of the plurality of sidewall boiler water pipes are spaced apart from the sidewall section.

5. The combustion device according to claim 1, wherein at least four blowing ports configured to introduce air into an upper portion of the combustion chamber are installed in a circumferential direction thereof at an interval.

6. The combustion device according to claim 2, wherein at least four blowing ports configured to introduce air into an upper portion of the combustion chamber are installed in a circumferential direction thereof at an interval.

7. The combustion device according to claim 3, wherein at least four blowing ports configured to introduce air into an upper portion of the combustion chamber are installed in a circumferential direction thereof at an interval.

8. The combustion device according to claim 4, wherein at least four blowing ports configured to introduce air into an upper portion of the combustion chamber are installed in a circumferential direction thereof at an interval.

* * * * *